(12) United States Patent
Corral

(10) Patent No.: US 8,619,845 B2
(45) Date of Patent: Dec. 31, 2013

(54) OPTIMIZING DATA RATE OF MULTI-BAND MULTI-CARRIER COMMUNICATION SYSTEMS

(75) Inventor: Celestino A. Corral, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 12/959,914

(22) Filed: Dec. 3, 2010

(65) Prior Publication Data

US 2012/0140804 A1    Jun. 7, 2012

(51) Int. Cl.
H04B 3/46    (2006.01)

(52) U.S. Cl.
USPC ........................................... 375/224; 375/231

(58) Field of Classification Search
USPC ................ 375/224, 260; 370/241; 379/90.01; 455/67.11, 67.7; 702/79
See application file for complete search history.

(56) References Cited

U.S. PATENT DOCUMENTS

| 5,852,630 A * | 12/1998 | Langberg et al. | 375/219 |
| 2006/0133542 A1 * | 6/2006 | Julian | 375/340 |
| 2010/0195707 A1 * | 8/2010 | Duan et al. | 375/227 |

FOREIGN PATENT DOCUMENTS

WO    2012074887    6/2012

OTHER PUBLICATIONS

Baig S., et al., "Discrete multi-Tone (DMT) transceiver with dynamic rate adaptive water-filling bit-loading technique for in home power line communication networks", Multi Topic Conference, 2003, INMIC 2003, 7th International Islamabad, Pakistan, Dec. 8-9, 2003, Piscataway, NJ, USA, IEEE, Dec. 8, 2003, pp. 84-89, XP010782414, DOI: 10.1109/INMIC.2003.1416620 ISBN: 978-0-7803-8183-4.
Hazen M. E., "The Technology Behind HomePlug AV Power line Communications", Computer, IEEE Service Center, Los Alamitos, CA, US, vol. 41, No. 6, Jun. 1, 2008, pp. 90-92, XP011228336, ISSN: 0018-9162, DOI: 10.1109/MC.2008.205.
International Search Report and Written Opinion—PCT/US2011/062155—ISA/EPO—Mar. 2, 2012, 14 pages.
Kim et al., "Channel adaptation for time-varying power line channel and noise synchronized with AC cycle", Power Line Communications and Its Applications, 2009, ISPLC 2009, IEEE International Symposium on, IEEE, Piscataway, NJ, USA, Mar. 29, 2009, pp. 250-254, XP031453695, ISBN: 978-1-4244-3790-0.

(Continued)

Primary Examiner — Dhaval Patel
(74) Attorney, Agent, or Firm — DeLizio Gilliam, PLLC

(57) ABSTRACT

Wired and wireless communication networks can be subject to noise and interference resulting data corruption. In a communication system comprising a first network device and a second network device, the first and the second network devices can be configured for optimizing the data rate of the communication system. On receiving a multi-band signal at the first network device from the second network device during a channel adaptation mode, the multi-band signal can be split into a plurality of independent frequency band signals. A performance measurement of a first of the plurality of frequency band signals corresponding to a lowest frequency band signal can be calculated. Communication parameters can be determined for each of the plurality of frequency band signals based on the performance measurement of the first of the plurality of frequency band signals. The communication parameters can be provided from the first network device to the second network device.

21 Claims, 8 Drawing Sheets

(56) References Cited

OTHER PUBLICATIONS

Powerline Telecommunication (PTL); Detailed In-house Architecture and Protocols; Drafts ETSI PLT TS, ETSI Draft; PLT22_TD12, European Telecommunications Standards Institute (ETSI), 650, Route Des Lucioles; F-06921 Sophia-Antipolis; France, vol. 3, Jul. 2, 2003, pp. 1-32, XP014051029, [retrieved on Jul. 2, 2003] p. 12, line 1-10 p. 16, line 1—p. 21, line 15.

Sawada N., et al., "Bit and power allocation for power-line Communications under nonwhite and cyclostationary noise environment", Power Line Communications and Its Applications, 2009, ISPLC 2009, IEEE International Symposium on, IEEE, Piscataway, NJ, USA, Mar. 29, 2009, pp. 307-312, XP031453705, ISBN: 978-1-4244-3790-0.

Schwager A., et al., "Potential of broad and power line home networking", Consumer Communications and Networking Conference, 2005, CCNC, 2005 Second IEEE, IEEE, Piscataway, NJ, USA, Jan. 3, 2005, pp. 359-363, XP010787664, DOI: 10.1109/CCNC.2005.1405197 ISBN: 978-0-7803-8784-3.

Written Opinion of the International Preliiminary Examining Authority—PCT/US2011/062155—Dec. 5, 2012, 6 pages.

* cited by examiner

OPTIMIZING DATA RATE OF MULTI-BAND MULTI-CARRIER COMMUNICATION SYSTEMS

BACKGROUND

Embodiments of the inventive subject matter generally relate to the field of communication systems and more particularly, to optimizing the data rate of multi-band multi-carrier communication systems.

Electronic devices can use wired or wireless communication networks for data communication. In one example, electric power lines typically used for distributing electric power to buildings and other structures can be used to implement broadband over powerline communication (in a wired powerline communication network) within the buildings and other structures. Powerline communication provides a means for networking electronic devices (e.g., consumer electronics, smart appliances, etc.) together and also for connecting the electronic devices to the Internet. For example, HomePlug® devices can be used for wired broadband networking using IEEE P1901 standards for broadband over powerline communication. In another example, wireless local area networks (WLANs) can enable electronic devices to wirelessly exchange data and connect to the Internet. However, both wired and wireless communication networks can be subject to a wide variety of noise and interference sources, which can corrupt data packets exchanged via the communication networks.

SUMMARY

Various embodiments for optimizing the data rate of multi-band multi-carrier communication systems are disclosed. In one embodiment, a multi-band signal is received at a first network device of a communication system from a second network device of the communication system during a channel adaptation mode. The multi-band signal is split into a plurality of independent frequency band signals. A performance measurement of a first of the plurality of frequency band signals is calculated. The first of the plurality of frequency band signals corresponds to a lowest frequency band signal. Communication parameters are determined for each of the plurality of independent frequency band signals based, at least in part, on the performance measurement of the first of the plurality of frequency band signals. The communication parameters are provided from the first network device to the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
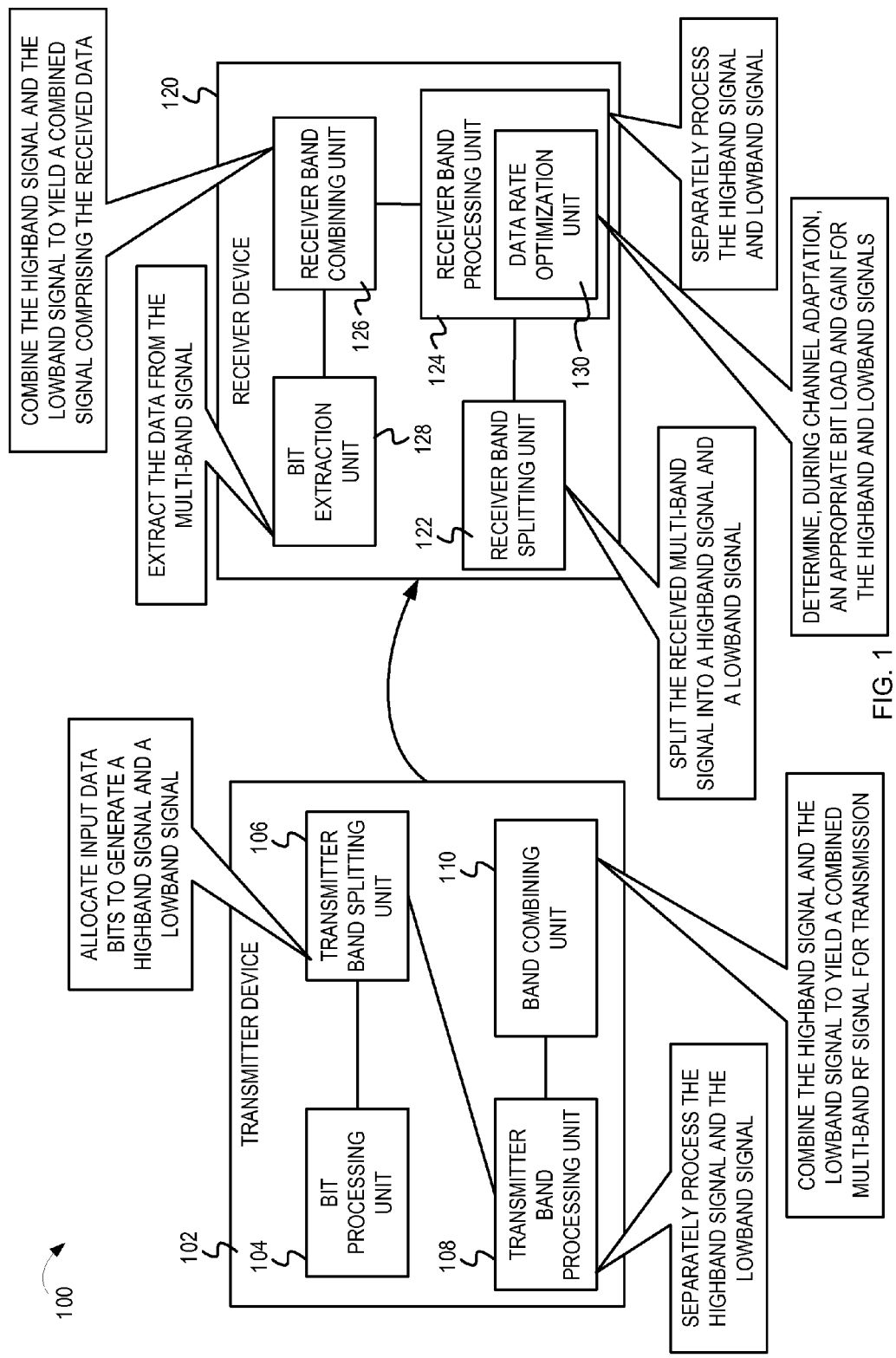
FIG. 1 depicts an example block diagram including a mechanism for optimizing the data rate of a multi-band multi-rate communication.

The description that follows includes exemplary systems, methods, techniques, instruction sequences, and computer program products that embody techniques of the present inventive subject matter. However, it is understood that the described embodiments may be practiced without these specific details. For instance, although examples refer to techniques for optimizing the data rate of powerline communication systems, in other embodiments, the techniques for optimizing the data rate can be extended to communication devices in other wired communication networks (e.g., Ethernet, Fiber Distributed Data Interface (FDDI), Asynchronous Transfer Mode (ATM), etc.). The techniques for optimizing the data rate may also be implemented by wireless communication devices and standards (e.g., wireless local area network (WLAN) devices). In other instances, well-known instruction instances, protocols, structures, and techniques have not been shown in detail in order not to obfuscate the description.

Communication systems typically encounter a variety of noise and interference sources in exchanging data with other communication systems via a communication medium. For example, a powerline communication medium may exhibit poor channel characteristics including large attenuation at higher frequencies, varying loads and corresponding delay spread, time and frequency-varying noise sources (e.g., energy saving devices, advanced lighting technology devices), etc. Furthermore, the ubiquity of the powerline communication medium can also cause a powerline communication system to be subject to high interference. Some communication systems typically employ orthogonal frequency division multiplexing (OFDM) techniques to shape the frequency spectrum of a signal to be transmitted and to comply with regulated emission limits. This can result in a multi-band signal comprising frequency bands at different signal levels. For example, as mandated by the Federal Communications Commission (FCC), signals transmitted in the 30 MHz-50 MHz frequency band should be transmitted at a signal level that is 30 dB lower than the 2 MHz-30 MHz frequency band. However, decreasing the signal level of higher frequency bands can reduce the signal-to-noise ratio (SNR) of the higher frequency bands, potentially limiting their usefulness for communication. Therefore, the data rate of such a multi-band multi-carrier communication system may need to be optimized subject to the constraint of multiple frequency bands implementing different signal levels as required by the application and/or regulatory limits.

In some embodiments, a communication device in a multi-band multi-carrier communication system can be configured for data rate optimization. During both transmit and receive operations, a multi-band signal can be split into two or more independent frequency band signals and each of the frequency band signals can be independently filtered and gain adjusted in the analog domain. During a channel adaptation mode, the communication device can receive a multi-band signal and can measure the fidelity of the multi-band signal per carrier in the frequency band associated with the highest signal level (e.g., typically a signal in the lowest frequency band). The data rate of the overall communication system can be optimized by adjusting the gain associated with each of the frequency band signals to set a nominal noise operating point for each frequency band signal. Because the SNR associated with each frequency band signal can be affected by noise from the other frequency bands, the communication device can (based on the measured fidelity) adjust the signal level of each frequency band that comprises the multi-band signal and can calculate the optimum balance of noise contributions that maximize the data rate of the overall communication system. Such a technique for optimizing the data rate of the multi-band multi-carrier communication system can result in an improvement in data rate by enabling optimal transmission (e.g., at the maximum possible data rate) in the high frequency bands and in the low frequency bands. In implementing the techniques for data rate optimization described herein, excess SNR in the low frequency band can be traded-off to balance and maximize the SNR among the higher frequency bands. This can result in an increase in SNR of the overall communication system, enable the communication system to support higher modulation levels, and can consequently result in an increase in the data rate of the overall communication system.

Figure 4:
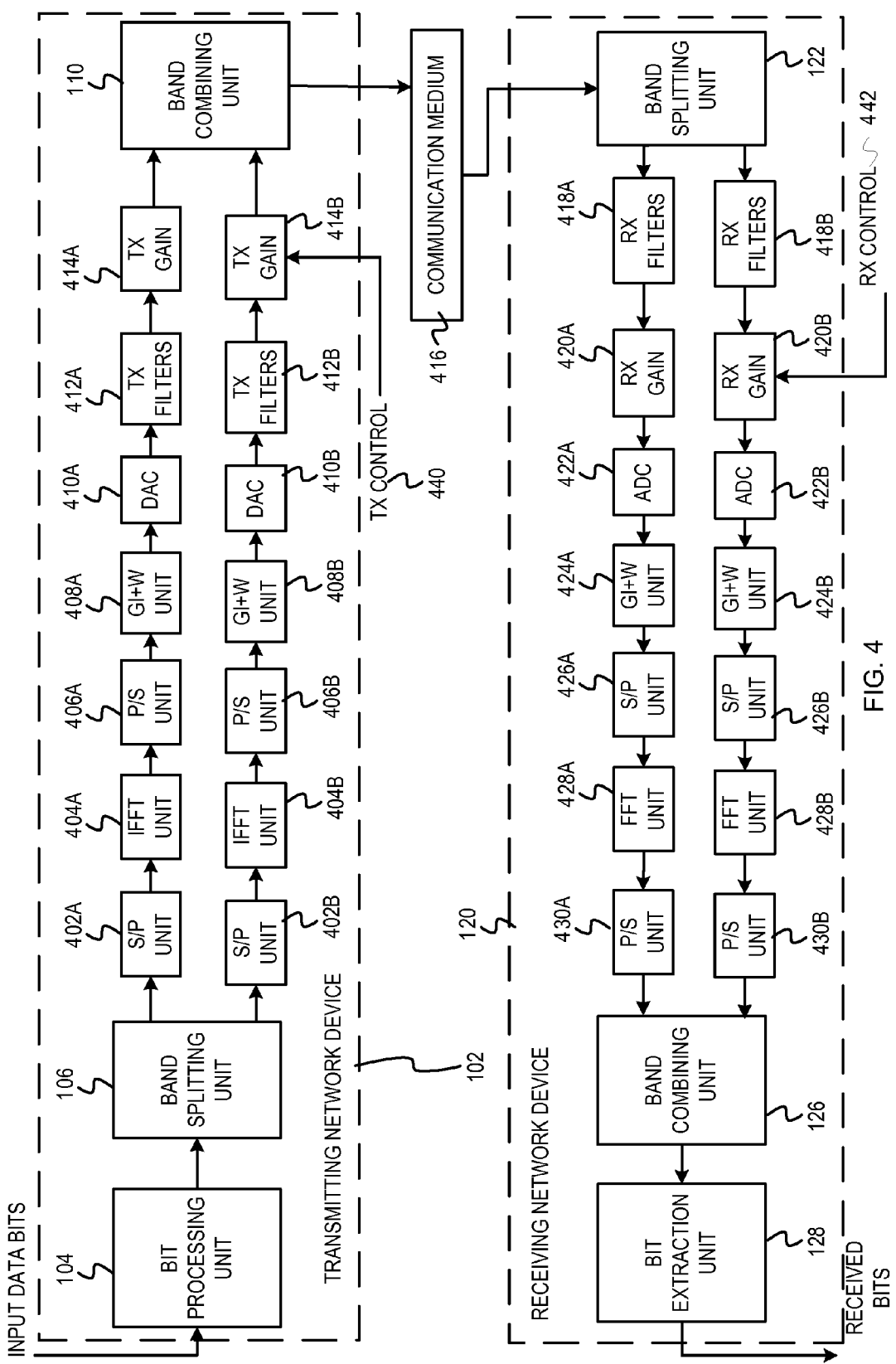
FIG. 4 is an example block diagram of one embodiment of a mechanism for optimizing the data rate of a multi-band multi-rate communication.
Figure 5:
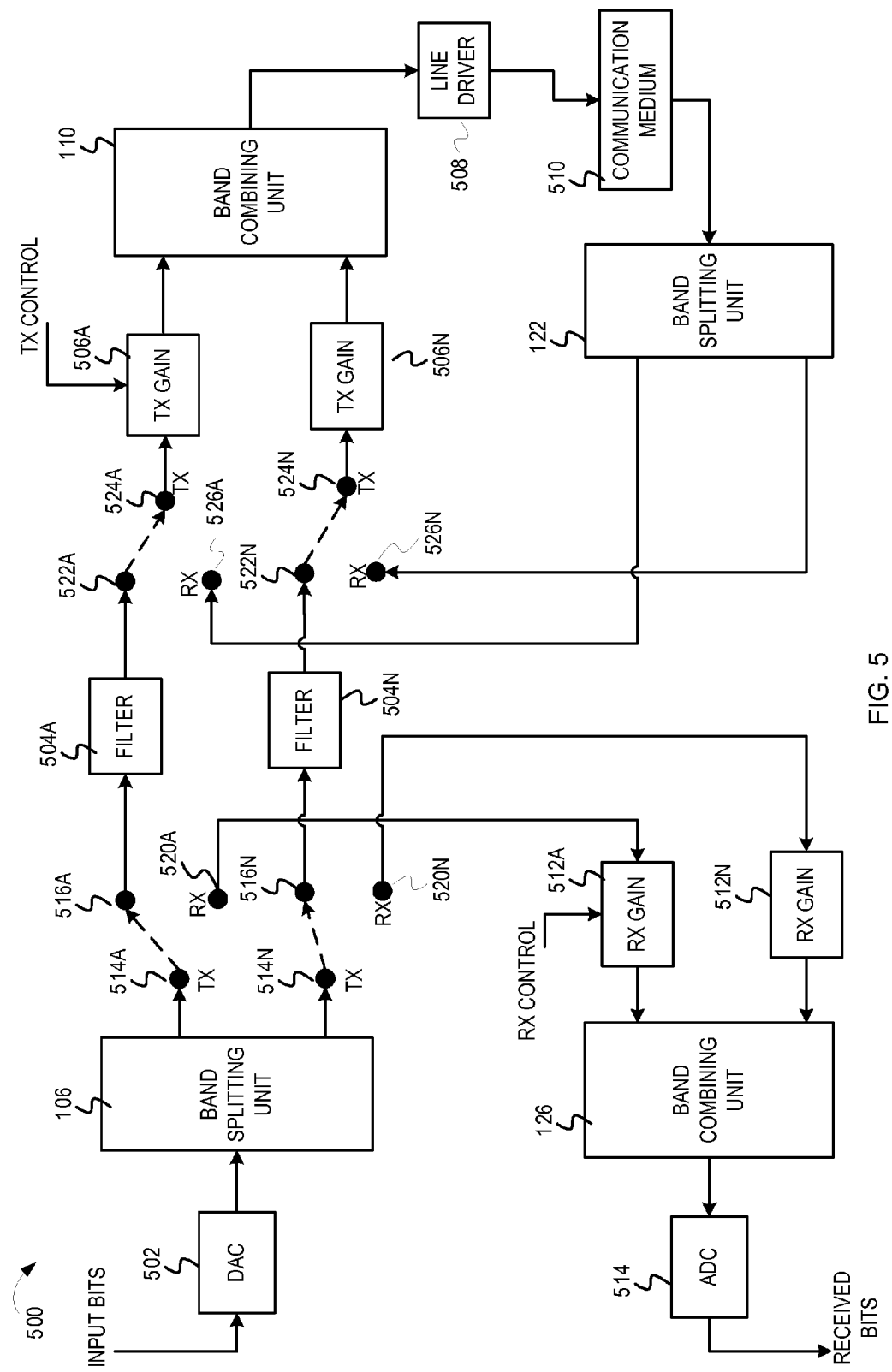
FIG. 5 is an example block diagram of a second embodiment of a mechanism for optimizing the data rate of a multi-band multi-rate communication.
Figure 6:
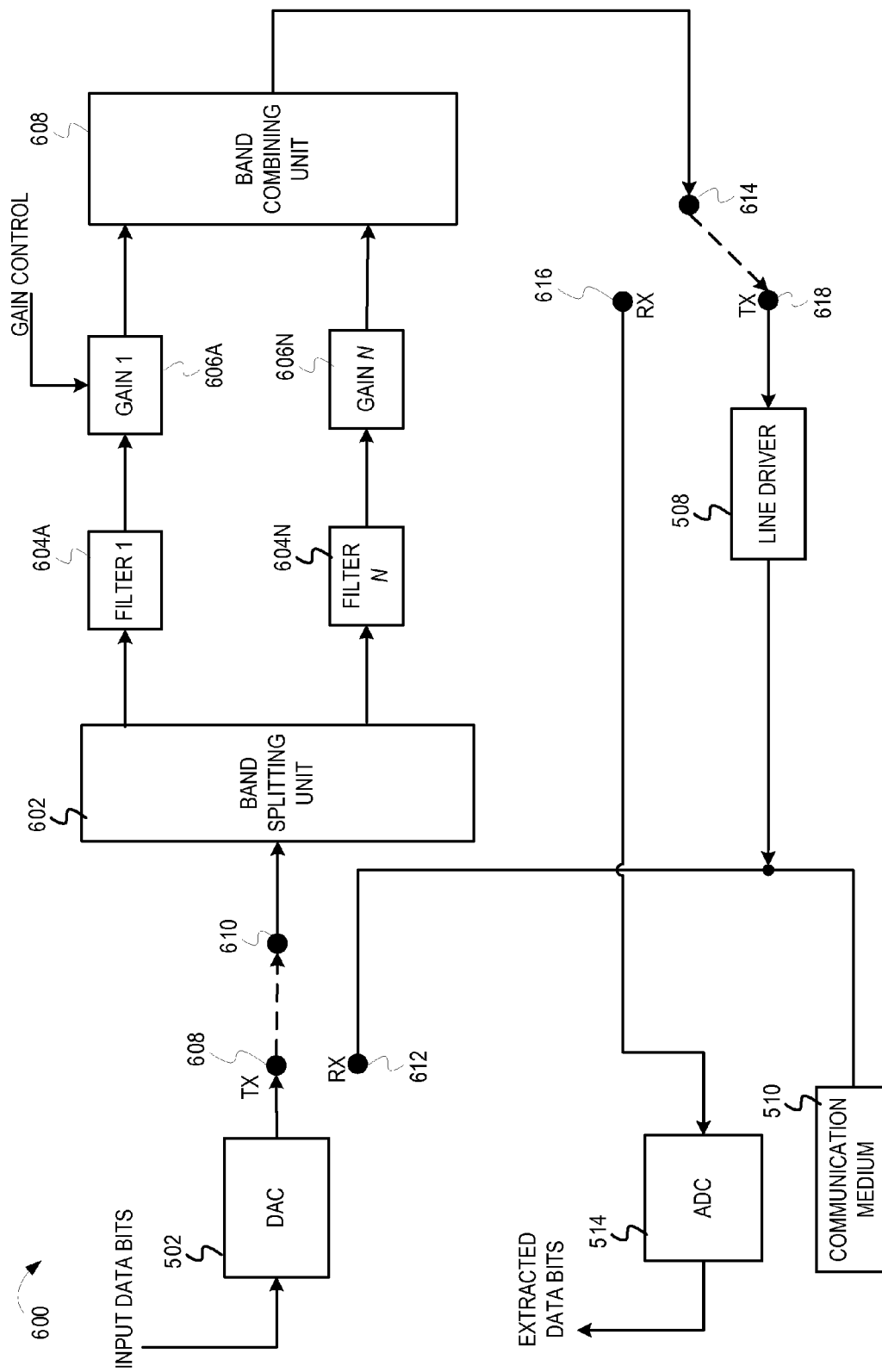
FIG. 6 is an example block diagram of a third embodiment of a mechanism for optimizing the data rate of a multi-band multi-rate communication.

FIG. 1 depicts an example block diagram including a mechanism for optimizing the data rate of a multi-band multi-rate communication system. FIG. 1 depicts a multi-band multi-carrier OFDM communication system 100 comprising a transmitting device 102 and a receiving device 120. The transmitting device 102 comprises a bit processing unit 104, a transmitter band-splitting unit 106, a transmitter band-processing unit 108, and a transmitter band-combining unit 110. The receiving device 120 comprises a receiver band-splitting unit 122, a receiver band-processing unit 124, a receiver band-combining unit 126, and a bit extraction unit 126. The receiver band-processing unit 124 also comprises a data rate optimization unit 130. It is noted that although not depicted in FIG. 1, the transmitting device 102 can comprise one or more components of the receiving device 120 (e.g., the receiver band-splitting unit 122, the receiver band-processing unit 124, the receiver band-combining unit 126, the bit extraction unit 126, and the data rate optimization unit 130). Also, the receiving device 120 can comprise one or more components of the transmitting device 102 (e.g., the bit processing unit 104, the transmitter band-splitting unit 106, the transmitter band-processing unit 108, and the transmitter band-combining unit 110). FIGS. 4-6 will further illustrate example implementations of the multi-band multi-carrier OFDM communication system 100.

When a communication link between the transmitting device 102 and the receiving device 120 is established, the transmitting device 102 and the receiving device 120 exchange pre-determined data bits (e.g., training symbols) during a channel adaptation mode. In the channel adaptation mode, the transmitting device 102 can load a subset of the input data bits to be transmitted to each frequency carrier of a multi-band signal to determine a tone map in accordance with which subsequent data is to be transmitted (e.g., during a normal operating mode). The tone map can be a mapping of modulation level to a frequency carrier tone in an OFDM signal. The tone map can indicate a bit load associated with (or a number of bits that can be transmitted on) each of the frequency carriers in the OFDM signal. The bit-processing unit 104 pre-processes the input data bits to be transmitted. For example, the bit-processing unit 104 may perform bit encoding, bit interleaving, bit-to-symbol conversion, etc. on the input data bits. The transmitter band splitting unit 106 splits the input data bits into high frequency band ("highband") data and low frequency band ("lowband") data. The transmitter band-splitting unit 106 can perform bit-to-band allocation to allocate each bit of the input data bits to either the highband or the lowband. The bit-splitting unit 106 can assign the input data bits to each frequency carrier that comprises the highband and the lowband to yield the best SNR at each of the frequency carriers. It is noted, however, in that other implementations, the transmitter band-splitting unit 106 can allocate the input data bits across any suitable number of independent frequency bands. The transmitter band-processing unit 108 then separately processes the highband data and the lowband data to generate a highband signal and a lowband signal respectively. In one implementation, as depicted in FIG. 4, the transmitter band-processing unit 108 can comprise distinct highband processing units and lowband processing units. The transmitter band processing unit 108 can perform inverse fast Fourier transform (IFFT), guard interval (GI) insertion and windowing ("GI+W insertion"), digital to analog conversion, filtering, etc. to yield the highband signal and the lowband signal. In one implementation, when the transmitting device 102 is a powerline communication device, the transmitter band-processing unit 108 can process the highband data and the lowband data to generate Robust OFDM (ROBO) highband and lowband signals. For example, the transmitter band-processing unit 108 can perform quadrature phase shift keying (QPSK) modulation, use a forward error correction (FEC) rate of ¼, create data redundancy in the frequency and time domains, etc. The transmitter band-processing unit 108 can process the highband data and the lowband data so that the corresponding highband signal and lowband signal are generated at full scale after IFFT is performed.

The transmitter band-processing unit 108 can then independently filter each of the frequency band signals (e.g., the highband signal and the lowband signal) in the analog domain. Furthermore, each of the frequency band signals can be independently gain adjusted (e.g., amplified or attenuated) to meet the corresponding power spectral density (PSD) requirements in the analog domain. For example, based on knowledge that the signal level of the highband signal should be 30 dB below the signal level of the lowband signal (as directed by the FCC PSD emissions mask), gain stages associated with the highband signal can be configured to adjust the signal level of the highband signal to the desired signal level relative to the signal level of the lowband signal. Because the lowband signal (e.g., in the frequency range from 2 MHz to 30 MHz) and the highband signal (e.g., in the frequency range from 30 MHz to 45 MHz) are each at full resolution of their respective DACs, even though the signal level of the highband signal is 30 dB below the signal level of the lowband signal, each of the frequency carriers that constitute the highband can still yield their respective highest SNR. Next, the transmitter band-combining unit 110 can combine the highband signal and the lowband signal. Subsequent baseband processing units can further process (e.g., encode, modulate, up-convert, etc.) the resultant signal (i.e., the combined highband signal and the lowband signal) to yield a multi-band RF transmit signal. The transmitter band-combining unit 110 can provide the multi-band RF signal for subsequent amplification by a power amplifier (also known as a line driver) and for transmission to the receiving device 120 via a communication medium.

On receiving the multi-band RF signal from the transmitting device 102, the receiver band splitting unit 122 splits the received multi-band signal into a highband signal ("received highband signal") and a lowband signal (received lowband signal"). It is noted that in some implementations, the receiver band-splitting unit 122 could split the received multi-band signal into any suitable number (N) of independent frequency band signals. The number of independent frequency band signals could be pre-determined or could be agreed upon by the transmitting device 102 and the receiving device 120. Because the lowband signal and the highband signal were transmitted (e.g., from the transmitting device 102) at full resolution of their respective DACs, the SNR of the received lowband signal and the SNR of the received highband signal may be impacted only by noise of the communication channel. In one implementation, as depicted in FIG. 4, the receiver band-processing unit 124 can comprise distinct highband processing units and lowband processing units to separately process the received highband signal and the received lowband signal respectively. The receiver band-processing unit 124 can perform gain adjustment, filtering, analog-to-digital conversion, windowing and guard interval extraction ("GI+W extraction"), etc. on the received highband signal and the received lowband signal. The receiver band-processing unit 124 can independently adjust the gain of the received lowband signal and the received highband signal to maximize the SNR of the received lowband signal and the received highband signal at the input of their respective ADC(s). The data rate optimization unit 130 of the receiver band-processing unit 124 can also determine (during a channel adaptation mode) an appropriate bit load and gain for the highband signal and the lowband signal. During the channel adaptation mode, on receiving the multi-band signal, the data rate optimization unit 130 can calculate the SNR of the received lowband signal ("lowband SNR"). If the lowband SNR exceeds the required SNR for the modulation in the lowband ("threshold lowband SNR"), the data rate optimization unit 130 can trade-off the excess lowband SNR to increase the bit load of the highband by reducing the power per carrier in the lowband. The data rate optimization unit 130 can cause the transmitting device 102 to transmit at a higher modulation level in the highband while maintaining the full DAC resolution. Upon reception of subsequent multi-band signals in the channel adaptation mode, the receiving device 120 can increase the gain of the highband signal to increase the energy of the highband signal without affecting the energy of the lowband signal in an attempt to achieve a higher data rate. Operations of the data rate optimization unit 130 will further be described with reference to FIGS. 2 and 3. After processing the highband signal and the lowband signal, the receiver band-combining unit 126 combines the processed highband signal and the processed lowband signal to yield a processed multi-band signal comprising received data bits. The bit extraction unit 128 extracts the data bits from the processed multi-band signal. The bit extraction unit 128 can perform symbol-to-bit mapping, de-interleaving, decoding, etc. to extract the data bits.

Figure 2:
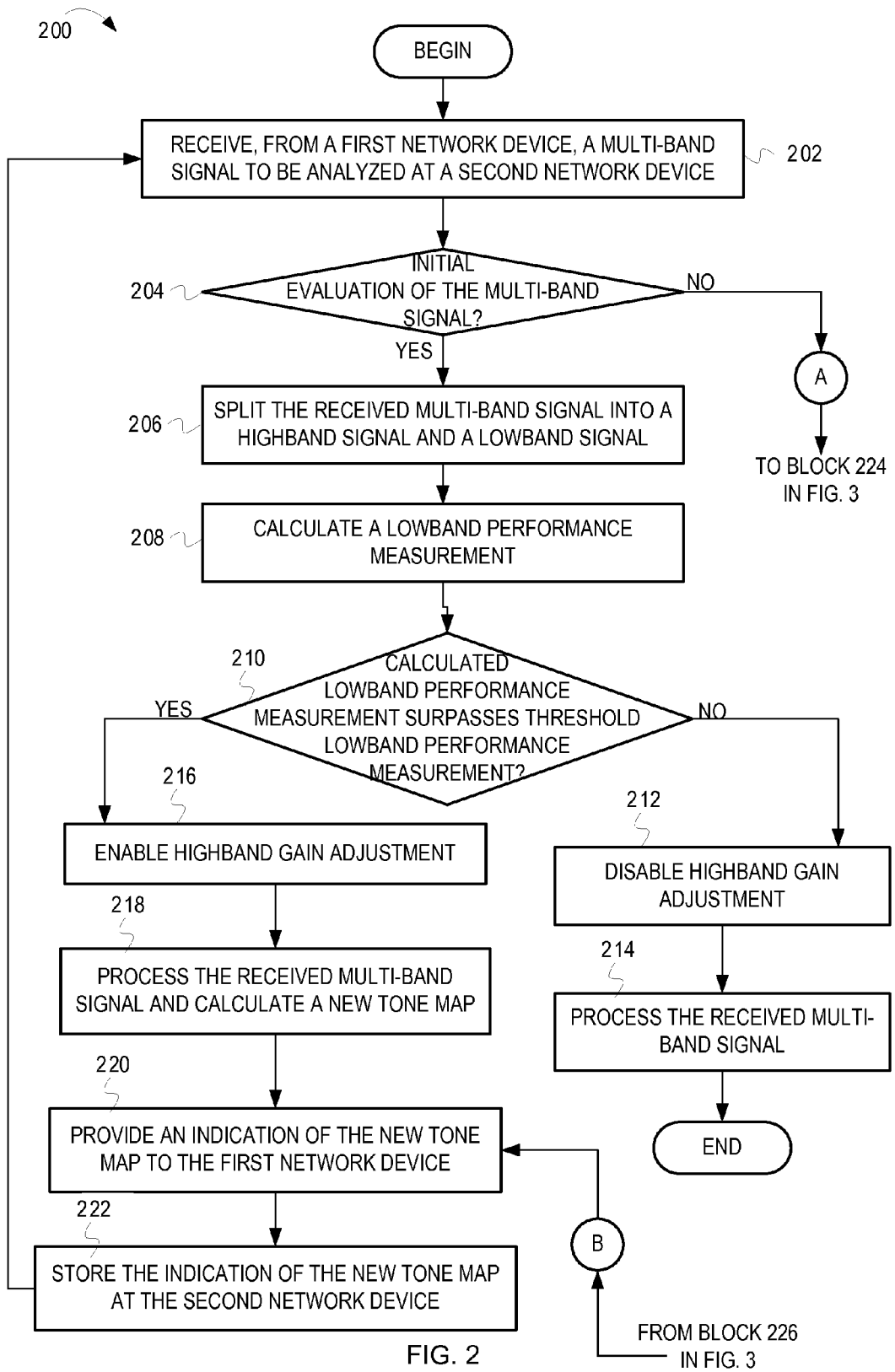
FIG. 2 is an example flow diagram illustrating example operations for optimizing the data rate of a dual-band communication system.
Figure 3:
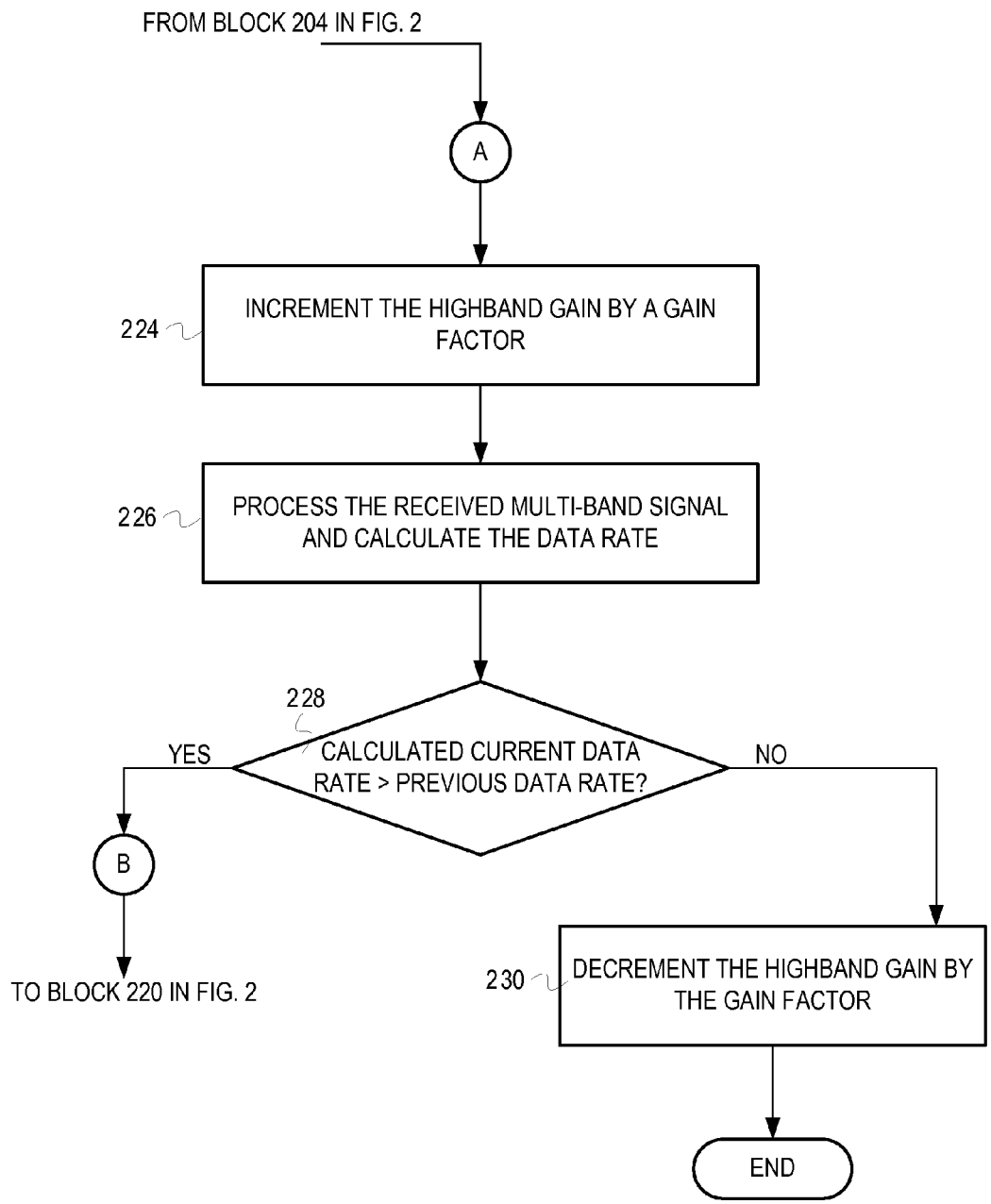
FIG. 3 is a continuation of FIG. 2 and also illustrates example operations for optimizing the data rate of a dual-band communication system.

FIG. 2 and FIG. 3 depict an example flow diagram ("flow") 200 illustrating example operations for optimizing the data rate of a dual-band communication system. The flow 200 begins at block 202 in FIG. 2.

At block 202, a multi-band signal to be analyzed is received from a first network device of a communication system at a second network device of the communication system. For example, the receiving device 120 of FIG. 1 can receive the multi-band signal from the transmitting device 102. As will be described below, the receiving device 120 can analyze the received multi-band signal to determine optimal communication parameters. The communication parameters can include transmission parameters (e.g., tone map, gain, data rate, etc.) with which the transmitting device 102 should transmit subsequent multi-band signals to maximize performance (e.g., SNR) of the communication system. The communication parameters can also include reception parameters (e.g., processing gain, etc.) at which the receiving device 120 should process the received multi-band signal to maximize the performance of the multi-band multi-carrier communication system that comprises the transmitting device 102 and the receiving device 120. The flow continues at block 204.

At block 204, it is determined whether an initial evaluation of the multi-band signal is being executed. For example, the receiving device 120 can determine whether a multi-band signal was previously received from the transmitting device 102. If the multi-band signal from the transmitting device 102 is not being evaluated for the first time, the data rate optimization unit 130 of the receiving device 120 can vary communication parameters with reference to previously calculated communication parameters in an attempt to improve the performance (e.g., SNR, data rate, etc.) of the overall communication system. As will be described below, in the channel adaptation mode, the data rate optimization unit 130 can iteratively (e.g., based on successively receiving multi-band signals from the transmitting device 102) determine optimal communication parameters in accordance with which to transmit and process the multi-band signals to achieve the best performance. If it is determined that the initial evaluation of the multi-band signal is being executed, the flow continues at block 206. Otherwise, the flow continues at block 224 in FIG. 3.

At block 206, the received multi-band signal is split into a highband signal and a lowband signal. For example, the receiver band-splitting unit 122 of FIG. 1 can split the received multi-band signal into two independent frequency band signals—the lowband signal and the highband signal. It is noted, however, that the receiver band-splitting unit 122 can split the received multi-band signal into any suitable number of independent frequency band signals. In one implementation, the number of independent frequency band signals can be determined based on a number of different PSD levels that span the frequency spectrum being used for communication. For example, the 2 MHz-45 MHz frequency spectrum may comprise two PSD levels—a first PSD level for a 2 MHz-30 MHz frequency band and a second PSD level (that is 30 dB below the first PSD level) for a 30 MHz-45 MHz frequency band. Thus, the received multi-band signal may be split into two frequency bands—the lowband signal that comprises frequency carriers in the range 2 MHz-30 MHz and the highband signal that comprises frequency carriers in the range 30 MHz-45 MHz. In other implementations, the number of independent frequency band signals into which the received multi-band signal should be split can be pre-determined, communicated by the transmitting device 102, or previously negotiated with the transmitting device 102. As will be described below, the data rate optimization unit 130 and the receiver band-processing unit 124 can independently process the highband signal and the lowband signal to determine the optimal communication parameters in accordance with which to transmit and process the multi-band signals to achieve the best performance. The flow continues at block 208.

At block 208, a performance measurement associated with the lowband signal ("lowband performance measurement") is calculated. For example, the data rate optimization unit 130 can determine the lowband performance measurement to optimize the data rate of the communication system. The lowband performance measurement can be a measure of the signal energy and the noise energy in the lowband. It is noted that if the received multi-band signal is split into more than two independent frequency bands, the performance measurement of the frequency band that is associated with the highest power level and that implements the highest modulation may be calculated. In one implementation, to calculate the lowband performance measurement, the receiver band-processing unit 124 can isolate the lowband signal by suppressing the highband signal (e.g., by setting the gain associated with the highband signal to zero). In one example, the data rate optimization unit 130 can calculate a mean SNR or a median SNR of the lowband signal ("lowband SNR") as the lowband performance measurement. The lowband SNR can be used to maximize the data rate of the overall communication system by maximizing the data rate of each of the independent frequency bands—starting with the frequency bands with the highest SNR (e.g., the lower frequency bands) and progressively evaluating the frequency bands with lower SNR (e.g., the higher frequency bands). It is noted that in other implementations, other suitable lowband performance measurement (e.g., mean bit load, median bit load, bit error rate (BER), etc.) can be calculated. In some implementations, the lowband performance measurement can be determined as a weighted combination of one or more individual lowband performance measurements. For example, the lowband performance measurement can be determined as a weighted combination of the lowband SNR and the lowband BER. The individual lowband performance measurements can be weighted depending on the number of frequency carriers that comprise the lowband, the communication channel profile, etc. In some implementations, the weighting can be varied depending on the attenuation, noise, and other interference encountered by the communication channel (e.g., frequency-selective fading, frequency-dependent channel noise). The flow continues at block 210.

At block 210, it is determined whether the calculated lowband performance measurement surpasses a threshold lowband performance measurement. For example, the data rate optimization unit 130 can compare the calculated lowband SNR against a threshold lowband SNR to determine whether the calculated lowband SNR is less than the threshold lowband SNR. The data rate optimization unit 130 can also compare the calculated lowband SNR against the threshold lowband SNR to determine whether excess SNR margin available in the lowband to improve the data rate of the highband. In one implementation, the threshold lowband SNR may be the highest SNR achievable in the lowband and may be determined based on knowledge of the highest modulation level supported by the lowband for a given coding rate. In another implementation, the threshold lowband SNR may be a percentage of the highest SNR achievable in the lowband. For example, if the highest SNR achievable in the lowband is 50 dB, the threshold lowband SNR may be 80% of 50 dB (i.e., 40 dB). As will be described below, the data rate optimization unit 130 may or may not evaluate the highband signal depending on whether the calculated lowband performance measurement surpasses the threshold lowband performance measurement. The calculated lowband SNR being less than the threshold lowband SNR can serve as an indication that the gain of the lowband signal ("lowband gain") and the gain of the highband signal ("highband gain") cannot be varied to improve the performance (e.g., data rate, SNR) of the overall communication system. The data rate optimization unit 130 can determine that the communication parameters employed by the transmitting device 102 and the receiving device 120 should not be changed. Alternately, if the calculated lowband SNR is greater than the threshold lowband SNR, the data rate optimization unit 130 can evaluate the highband signal to maximize the performance of the overall communication system. For example, if the threshold lowband SNR is 35 dB and the calculated lowband SNR is determined to be 30 dB, the data rate optimization unit 130 can determine not to enable the highband gain adjustment. As another example, if the average bit load of the lowband is comparable to the achievable bit load of the highband, the data rate optimization unit 130 can determine not to enable the highband gain adjustment because the highband gain adjustment may not greatly affect the overall data rate of the communication system. If it is determined that the calculated lowband performance measurement surpasses the threshold lowband performance measurement, the flow continues at block 216, where the data rate optimization unit 130 can recalculate the tone map and other communication parameters to achieve the best performance of the communication system. If it is determined that the calculated lowband performance measurement does not surpass the threshold lowband performance measurement, the flow continues 212.

At block 212, highband gain adjustment is disabled. The flow 200 moves from block 210 to block 212 on determining that the lowband performance measurement (e.g., the calculated lowband SNR) does not surpass the threshold lowband performance measurement (e.g., the threshold lowband SNR). As described above, the calculated lowband SNR being less than the threshold lowband SNR can serve as an indication that excess SNR margin is not available in the lowband. Consequently, the data rate optimization unit 130 can determine that the SNR of the lowband cannot be traded-off to improve the bit load and the data rate of the highband. The data rate optimization unit 130 can disable subsequent procedures (described with reference to blocks 216-230) for evaluating the highband signal and for determining new communication parameters. The flow continues at block 214.

At block 214, the received multi-band signal is processed. For example, the receiver band-processing unit 124 can process the received multi-band signal. As described above with reference to FIG. 1 and below with reference to FIGS. 4-6, the receiver band processing unit 124 can independently adjust (e.g., amplify or attenuate) the gain of and filter the highband signal and the lowband signal. After independent gain adjustment and filtering, the receiver band-processing unit 124, may (as depicted in FIG. 4) or may not (as depicted in FIGS. 5-6) independently process the resultant highband and lowband signals, depending on the implementation of the receiving device 120. The receiver band-combining unit 126 can combine the processed highband and lowband signals to yield a combined processed received signal. The bit extraction unit 128 can then extract data bits from the combined processed received signal. From block 214, the flow ends.

At block 216, the highband gain adjustment is enabled. The flow 200 moves from block 210 to block 216 if it is determined that the calculated lowband performance measurement (e.g., the calculated lowband SNR) surpasses the threshold lowband performance measurement (e.g., the threshold lowband SNR). As described above, the calculated lowband SNR being greater than the threshold lowband SNR can serve as an indication that that excess SNR margin is available in the lowband. Consequently, the data rate optimization unit 130 can determine that the lowband SNR can be traded off to increase the highband gain and to maximize the data rate (e.g., PHY rate) of the overall communication system. The data rate optimization unit 130 can enable subsequent procedures for evaluating the highband signal and for determining a new tone map. The flow continues at block 218.

At block 218, the received multi-band signal is processed and a new tone map is calculated. After the highband gain adjustment is enabled, the data rate optimization unit 130 can determine the new tone map based on the calculated lowband SNR and based on the threshold lowband SNR. The new tone map can indicate a number of bits that can be transmitted on frequency carriers that constitute the low frequency band ("lowband bit load") and the number of bits that can be transmitted on frequency carriers that constitute the high frequency band ("highband bit load"). For example, the data rate processing unit 130 can reduce (at each iteration during the channel adaptation mode) the lowband gain and can increment the highband gain to reduce the lowband bit load, increment the highband bit load, and increase the data rate of the communication system. As another example, in a dual-band signal, the lowband signal may yield a lowband SNR of 45 dB after filtering and gain adjustment. If the communication channel (comprising the lowband and the highband) is reciprocal, the same SNR may be achieved at the transmitting device 102. Therefore, in one example, the transmitting device 102 may apply a maximum bit load of 12 bits for the lowband signal and may apply a maximum bit load of 6 bits for the highband signal. At the receiving device 120, the highband gain setting would, in this example, be 12 dB above the lowband gain setting after the receiving device 120 processes the lowband signal. The highband relative gain setting of 12 dB can be used to maximize the power of the highband signal while maintaining the lowband SNR above the threshold lowband SNR. It is noted that in other examples, the transmitting device 102 can apply any suitable maximum bit load for the lowband signal and the highband signal. In determining the new tone map, the data rate optimization unit 130 can also take the FEC rate, the BER, channel characteristics, etc. into consideration. The data rate optimization unit 124 can also process the received multi-band signal and can calculate the data rate (e.g., PHY rate) that can be achieved with the new tone map. In addition, the data rate optimization unit 130 can also calculate new communication parameters including new settings for the highband gain and the lowband gain based on the lowband performance measurement (e.g., the calculated lowband SNR). The data rate optimization unit 130 can also compensate for errors due to noise contribution from gain stages, unfiltered noise components, etc. The flow continues at block 220.

At block 220, an indication of the new tone map is communicated to the first network device. For example, the receiving device 120 can communicate to the transmitting device 102 the indication of the new tone map (e.g., the lowband bit load and the highband bit load) for each frequency carrier. The receiving device 120 may also provide an indication of the calculated data rate associated with the new tone map to the transmitting device 102. The transmitting device 102 can generate subsequent multi-band signals for transmission in accordance with the new tone map provided by the receiving device 120. For example, the bit-splitting unit 106 can assign the input data bits across each carrier of each of the highband and the lowband in accordance with the highband bit load and the lowband bit load provided by the receiving device 120 at block 220. The flow continues at block 222.

At block 222, the indication of the new tone map is stored at the second network device. For example, the data rate optimization unit 130 can store the new tone map (i.e., the lowband bit load and the highband bit load) in a local data structure at the receiving device 120. The data rate optimization unit 130 can also store one or more of a lowband SNR margin, a highband SNR margin, a lowband gain, a highband gain, lowband performance measurements, etc. for a particular communication channel (e.g., an additive white Gaussian noise (AWGN) channel). The data rate optimization unit 130 can keep track of the new tone map and the corresponding data rate to enable comparison against subsequent calculations of the tone map and the corresponding data rate. The receiving device 120 can use the stored communication parameters (e.g., stored gain settings, tone map, etc.) for processing multi-band signals subsequently received from the transmitting device 102. For example, in a normal operating mode (i.e., after channel adaptation is completed), the receiver band-processing unit 124 may receive a multi-band signal and may determine that the calculated lowband SNR is 45 dB. The receiver band-processing unit 124 may access the local data structure and may determine the lowband bit load and the highband bit load based on the calculated lowband SNR. The receiver band-processing unit 124 may also determine a highband gain setting and a lowband gain setting and can accordingly apply the appropriate gain while processing the highband signal and the lowband signal, respectively. The flow 200 then loops back to block 202 where a next multi-band signal is received from the second network device. As will further be described with reference to blocks 224-230 of FIG. 3, on subsequently receiving a multi-band signal in the channel adaptation mode, the receiving device 120 can increase the highband gain by a gain factor, calculate a new data rate, and accordingly determine whether to execute further iterations to optimize the highband gain and the data rate.

At block 224, the highband gain is incremented by a gain factor. The flow 200 moves from block 204 in FIG. 2 to block 224 in FIG. 3 on determining that the initial evaluation of the multi-band signal is not being executed. In one example, the data rate optimization unit 130 can increment the highband gain by a predetermined fixed gain factor (e.g., 2 dB). In another implementation, the data rate optimization unit 130 can increase the highband gain by a gain factor that is determined based on a predetermined (or previously stored) highband gain setting associated with the lowband performance measurement calculated at block 208. For example, the data rate optimization unit 130 may determine that the lowband SNR is 40 dB. The data rate optimization unit 130 may access the local data structure that comprises a list of lowband performance measurements and corresponding highband gain settings. The data rate optimization unit 130 may then determine (from the local data structure) that the predetermined highband gain setting associated with the lowband SNR of 40 dB is 8 dB. The data rate optimization unit 130 may also determine that the current highband gain is 5 dB. The data rate optimization unit 130 may, therefore, increase the highband gain by a gain factor that is equal to the difference between the predetermined highband gain setting and the calculated highband gain (i.e., 8 dB−5 dB=3 dB). The flow continues at block 226.

At block 226, the received multi-band signal is processed and the data rate associated with the multi-band signal is calculated. For example, the data rate optimization unit 130 can process the received multi-band signal and can calculate the data rate associated with the communication system. After the highband gain is increased, the data rate can be computed based on the tone map and based on the SNR associated with each of the frequency carriers that comprise the highband and the lowband. As the signal level of the highband is increased (e.g., by incrementing the highband gain), the noise level of the highband can also increase and can reduce the SNR of the lowband. However, as the signal level of the highband is increased, the SNR of the highband can also be improved. This can cause the highband to support a higher modulation level and can consequently increase the data rate of the overall communication system. By incrementing the highband gain, the data rate optimization unit 130 can attempt to identify an operating point at which the overall communication system achieves the best performance (e.g., the highest data rate). The flow continues at block 228.

At block 228, it is determined whether the calculated data rate is greater than the data rate calculated in a preceding iteration ("previous data rate"). For example, the data rate optimization unit 130 can determine whether the calculated data rate is greater than the previous data rate. As the data rate optimization unit 130 increments the highband gain and compares (at each iteration) the calculated current data rate of the overall communication system against the previous data rate of the overall communication system, at some operating point, the noise level of the highband can cause the data rate of the overall communication system to drop. The drop in the data rate can serve as an indication that a last assigned highband gain was the optimal gain setting for the highband signal. If the data rate optimization unit 130 determines that the calculated current data rate is greater than the previous data rate, the data rate optimization unit 130 can determine to further optimize the data rate of the overall communication system and can increase the highband gain by the gain factor on a subsequent iteration. If it is determined that the calculated current data rate is greater than the previous data rate, the flow continues at block 220 in FIG. 2, where the calculated data rate is communicated to the first network device 102 and is stored at the second network device 120. At the second network device 120, the previous data rate (and corresponding communication parameters) may be overwritten by the calculated current data rate (and corresponding communication parameters). If it is determined that the calculated current data rate is less than the previous data rate, the flow continues at block 230.

At block 230, the highband gain is decremented by the gain factor. The flow 200 moves from block 228 to block 230 if the data rate optimization unit 130 determines that the calculated current data rate is less than the previous data rate. The data rate optimization unit 130 can decrement the highband gain by the gain factor to maintain the last stored gain setting and to achieve the previous data rate. Additionally, the data rate optimization unit 130 can store the highband gain setting relative to the lowband gain setting and the lowband performance measurement. The last stored gain setting for the highband can then be implemented for all subsequent receptions from the transmitting device 102. The data rate optimization unit 130 may also generate a notification that the channel adaptation process is completed and that a tone map (that results in the best performance of the overall communication system) has been agreed upon by the transmitting device 102 and the receiving device 120. From block 230, the flow ends.

Although not depicted in FIGS. 2-3, in the normal operating mode, when the receiving device 120 receives a multi-band signal from the transmitting device 102, the receiver band-processing unit 124 may determine that the lowband gain is XdB and that the highband gain is YdB. The receiver band-processing unit 124 may then access the local data structure and may determine that for a lowband gain of XdB, the highband gain should be MdB. Accordingly, the receiver band-processing unit 124 can adjust the highband gain to MdB to achieve the best SNR for both the lowband signal and the highband signal. Likewise, the transmitting device 102 can access a similar local data structure that indicates the bit load for each frequency band that can be achieved at a specified SNR, a specified FEC rate, and a specified BER. For example, the transmitting device 102 may determine that 12 bits can be loaded on a specific frequency carrier to achieve a minimum SNR of 33 dB, with a FEC rate of $^{16}/_{21}$ and a BER of 4%.

It is noted that although FIGS. 1-3 describe the receiving device 120 determining the optimal highband gain, lowband gain, highband data rate, lowband data rate, and a corresponding tone map and communicating some/all of these communication parameters to the transmitting device 102, embodiments are not so limited. During the channel adaptation mode, the transmitting device 102 can also execute the operations described with reference to FIGS. 2-3. The transmitting device 102 can determine, based on a multi-band signal from the receiving device 120, an optimal tone map, optimal values of the highband and lowband gains, the highband and the lowband data rates, etc. and can communicate some/all of the communication parameters to the receiving device 120. The transmitting device 102 and the receiving 120 can negotiate a tone map that will yield a best performance of the overall communication system. Moreover, the operations described with reference to FIGS. 2-3 can be executed by both the transmitting device 102 and the receiving device 120 during channel adaptation, as part of a periodic (or random) channel evaluation process, in response to detecting changes in the communication channel (e.g., in response to detecting an increase in BER), and/or during other predefined times.

Multi-carrier signals can be allocated to multiple frequency bands and can be transmitted at different modulation levels to maximize spectral reuse. In some implementations, a single set of processing units can be used for each frequency band to be analyzed. A multi-band multi-carrier OFDM communication system with independent transmit and receive paths can be implemented to exploit the resolution of the ADC and DAC, as will be described with reference to FIG. 4.

FIG. 4 is an example block diagram of one embodiment of a mechanism for optimizing the data rate of a multi-band multi-rate communication system. FIG. 4 depicts a multi-band OFDM communication system 400 comprising independent band processing for transmit and receive operations. The communication system 400 comprises the transmitting device 102 and the receiving device 120 of FIG. 1. The transmitting device 102 comprises the bit processing unit 104 coupled to the transmitter band-splitting unit 106. The transmitter band-splitting unit 106 is coupled to serial-to-parallel conversion (S/P) units 402A and 402B. Each of the S/P units 402A and 402B are coupled to an IFFT unit 404A and 404B. The IFFT units 404A and 404B are coupled to parallel to serial conversion (P/S) units 406A and 406B. respectively. The P/S conversion units 406A and 406B are each coupled to GI+W units 408A and 408B. Each of the GI+W units 408A and 408B are coupled to a digital to analog converter (DAC) 410A and 410B. The DACs 410A and 410B are coupled to transmitter filters 412A and 412B, respectively. Finally, the transmitter filters 412A and 412B are coupled to transmitter gain stages 414A and 414B, respectively. Although not depicted in FIG. 4, the S/P units 402A and 402B, the IFFT units 404A and 404B, the P/S units 406A and 406B, the GI+W units 408A and 408B, the DACs 410A and 410B, the transmitter filters 412A and 412B, and the transmitter gain stages 414A and 414B can constitute the transmitter band-processing unit 108. The output of the transmitter gain stages 414A and 414B are provided to the transmitter band-combining unit 110. The output of the transmitter band-combining unit 110 is provided to the receiver band-splitting unit 122 of the receiving device 120 via a communication medium 416. The transmitter band-splitting unit 122 is coupled to receiver filters 418A and 418B. The receiver filters 418A and 418B are coupled to receiver gain stages 420A and 420B, respectively. The receiver gain stages 420A and 420B are each to coupled an analog to digital converter (ADC) 422A and 422B. Each of the ADCs 422A and 422B are coupled to a GI+W unit 424A and 424B. The GI+W units 424A and 424B are coupled to S/P units 426A and 426B, respectively. The S/P conversion units 426A and 426B are each coupled to an FFT unit 428A and 428B. Finally, the FFT units 428A and 428B are coupled to P/S conversion units 430A and 430B, respectively. Although not depicted in FIG. 4, the receiver filters 418A and 418B, the receiver gain stages 420A and 420B, the ADCs 422A and 422B, the GI+W units 424A and 424B, the S/P conversion units 426A and 426B, the FFT units 428A and 428B, and the P/S conversion units 430A and 430B can comprise the receiver band-processing unit 124 of FIG. 1. The output of the P/S conversion units 430A and 430B are provided to the transmitter band-combining unit 126. The transmitter band-combining unit 126 is coupled to the bit extraction unit 128.

In the transmitting device 102, a serial data stream (i.e., input data bits) is provided as input to the bit processing unit 104. The bit processing unit 104 pre-processes the input data bits. For example, the bit processing unit 104 can perform bit encoding, bit interleaving and bit-to-symbol conversion on the input data bits. The bit processing unit 104 can provide the processed input data bits to the transmitter band-splitting unit 106. The transmitter band-splitting unit 106 can be a digital multi-band data splitting unit that performs bit-to-band allocation. In other words, the transmitter band-splitting unit 106 can allocate each bit of the input bits to an appropriate frequency band (e.g., a highband or a lowband). The band splitting unit 106 can load all frequency carriers that comprise each of the frequency bands at full resolution of the DAC (i.e., with no PSD difference) to maximize SNR per frequency carrier at the input to the DAC. As depicted in FIG. 4, each transmit chain (i.e., the transmit chain associated with the highband and the transmit chain associated with the lowband) implements its own filters, gain stages, and other processing components. For example, in FIG. 4, the S/P unit 402A can convert the serial highband data into a parallel format and the IFFT unit 404A can generate a time domain representation of the highband data (e.g., to generate parallel data samples of a resultant time-domain highband signal). The P/S unit 406A can convert the parallel data samples into serial data samples, while the GI+W unit 408A can insert guard intervals at appropriate time instants and can perform windowing of the highband signal. The highband signal at the output of the DAC 410A is at full resolution of the DAC 410A for all the frequency carriers that comprise the highband. The DAC 410A can process the time domain samples of the highband signal and can generate an analog highband signal. The transmitter filter 412A (e.g., a band pass filter) can filter the resultant highband signal to remove any out-of-band energy. The transmitter gain stage 414A can vary the gain of (e.g., amplify or attenuate) the highband signal. The S/P unit 402B, the IFFT unit 404B, the P/S unit 406B, the GI+W unit 408B, the DAC 410B, the transmitter filter 412B, and the transmitter gain stage 414B can similarly process the lowband data generated by the band splitting unit 106 to yield the lowband signal. It is noted that the lowband signal at the output of the DAC 410B is at full resolution of the DAC 410B for all the frequency carriers that comprise the lowband. Also, the transmit gain control 440 can be applied to the transmit gain stages 414A and 414B to adjust the gain of the highband signal and the lowband signal in accordance with the FCC PSD emissions requirements. For example, it may be determined that the highband signal should be transmitted at 30 dB below the lowband signal. Thus, the transmit gain control 440 can be applied to cause the gain stage 414A to attenuate or amplify the highband signal so that the highband signal level is 30 dB below the lowband signal level. Thus, the highband signal and the lowband signal are independently processed to enable the transmitting device 102 to transmit the combined multi-band RF signal with the best SNR for the entire frequency spectrum. The band combining unit 110 can be an analog multi-band signal combining unit and can combine the highband and the lowband signals to yield a multi-band RF signal. The multi-band RF signal can then be further amplified (e.g., by a power amplifier) and transmitted via the communication medium 416 to the receiving device 120.

On receiving the multi-band RF signal, the receiver band-splitting unit 122 can split the received multi-band signal into a received highband signal and a received lowband signal. The receiver band-splitting unit 122 can be an analog domain multi-band signal splitting unit. The receiver filter 418A can filter the received highband signal. The receiver gain stage 420A can vary the gain of the received highband signal to fully illuminate the ADC 422A. The GI+W unit 424A can then perform windowing operations on the received highband signal and can remove the guard interval to yield serial samples of the received highband signal. The S/P unit 426A can convert the serial samples of the received highband signal into a parallel format and can provide the parallel received highband signal to the FFT unit 428A. The FFT unit 428A can transform a time domain representation of the received highband signal into a corresponding frequency domain representation of the received highband signal. The P/S unit 430A can convert the parallel output of the FFT unit 428A to a serial format. The receiver filter 418B, the receiver gain stage 420B, the ADC 422B, the GI+W unit 424B, the S/P unit 426B, the FFT unit 428B, and the P/S unit 430B can similarly process the received lowband signal generated by the receiver band-splitting unit 122. As described above, during a normal operation mode, the receiving device 120 can apply an appropriate highband gain and lowband gain based on gain settings previously determined during a channel adaptation mode. The receive gain control 442 can be applied to the receive gain stages 420A and 420B to adjust the gain of the received highband signal and the received lowband signal in accordance with the gain settings determined during the channel adaptation mode. After the received highband signal and the received lowband signal are independently processed by the processing components of their respective receive chains, the receiver band-combining unit 126 can combine the highband signal and lowband signal to yield a processed received multi-band signal and can provide the processed received multi-band signal to the bit extraction unit 128. The bit extraction unit 128 can perform symbol-to-bit mapping, de-interleaving, decoding, etc to generate the serial stream of the received digital bits.

It is noted that although FIG. 4 depicts the transmitter band-splitting unit 106 splitting the input data bits into two independent frequency bands (i.e., a highband and a lowband), embodiments are not so limited. In other embodiments, as will be described in FIGS. 5 and 6, the transmitter band-splitting unit 106 can split the input data bits into any suitable number of independent frequency bands. Consequently, the receiver band-splitting unit 122 can split the received multi-band signal into the same number of independent frequency bands to extract the data bits. In one implementation, the number of frequency bands into which the input data bits (and the received multi-band signal) should be split can be pre-determined based on the number of power levels (e.g., of the FCC PSD emissions mask) that span the frequency spectrum. In another implementation, the transmitting device 102 and the receiving device 120 could exchange messages and negotiate the number of frequency bands into which the input data bits (and the received multi-band signal) should be split.

Although not depicted in FIG. 4, the transmitting device 102 can also comprise one or more filter stages to filter the multi-band RF signal, a power amplifier to amplify the multi-band RF signal prior to transmission, an antenna to transmit the multi-band RF signal, etc. Furthermore, in some embodiments, the receiver band-combining unit 126 can be implemented so that the output of the S/P units 426A and 426B are provided to the receiver band-combining unit 126. A single FFT unit and a single P/S unit could then operate on the output of the receiver band-combining unit 126. In some implementations, the communication system of FIG. 4 can further be simplified by using a smaller number of FFT units if the computation time is sufficiently low (e.g., if the computation time is less than a transmit symbol time divided by the number of independent frequency bands to be processed). For example, the transmitting device 102 can implement appropriate memory management techniques to buffer data generated for each independent frequency band and the data can then be clocked to the DAC in the proper sequence. Furthermore, the communication system 400 of FIG. 4 can be simplified by implementing a single DAC at the transmitting device 102 and a single ADC at the receiving device 120. FIG. 5-6 depict an implementation of the multi-band multi-carrier communication system that employs a single DAC and a single ADC to reduce the number of components required for processing the highband signal and the lowband signal FIG. 5 is an example block diagram of a second embodiment of a mechanism for optimizing the data rate of a multi-band multi-rate communication. FIG. 5 depicts a multi-band multi-carrier communication system 500 in a single DAC/single ADC, shared filter configuration. The communication system 500 comprises a DAC 502 coupled to the transmitter band-splitting unit 106. The transmitter band-splitting unit 106 splits the input data bits into N independent frequency bands. When the communication system 500 operates in a "data transmit" mode, the N independent frequency band outputs 514A, 514N at the transmitter band-splitting unit 106 are coupled to corresponding N filters 504A, 504N. In FIG. 5, data on one frequency band at output terminal 514A of the transmitter band-splitting unit 106 is coupled to terminal 516A of (and is provided as input to) the filter 504A. Likewise, data on another frequency band at output terminal 514N of the transmitter band-splitting unit 106 is coupled to terminal 516N of (and is provided as input to) the filter 504N. Also, in the "data transmit" mode, the output of each of the filters 504A, 504N is coupled to a corresponding transmit gain stage 506A, 506N. In FIG. 5, terminal 522A of the filter 504A is coupled to input terminal 524A of transmit gain stage 506A. Terminal 522N of the filter 504N is coupled to input terminal 524N of transmit gain stage 506N. The outputs of the transmit gain stages 506A, 506N are provided to the transmitter band-combining unit 110. The output of the transmitter band-combining unit 110 is provided to a line driver 508. When the communication system 500 is in a "data receive" mode, the receiver band-splitting unit 122 receives a multi-band signal and splits the received multi-band signal into N independent frequency bands. In the "data receive" mode, the N independent frequency band outputs of the receiver band-splitting unit 122 are coupled to the filters 504A, 504N. In FIG. 5, data on one frequency band at output terminal 526A of the receiver band splitting unit 122 is coupled to terminal 522A of (and is provided as input to) the filter 504A. Likewise, data on another frequency band at output terminal 526N of the receiver band splitting unit 122 is coupled to terminal 522N of (and is provided as input to) the filter 504N. In the "data receive" mode, the output of each of the filters is coupled to a corresponding receive gain stage. In FIG. 5, the terminal 516A of the filter 504A is coupled to input terminal 520A of receive gain stage 512A. The terminal 516N of the filter 504N is coupled to input terminal 520N of receive gain stage 512N. The outputs of the receive gain stages 512A, 512N are provided to the receiver band-combining unit 126. The receiver band-combining unit 126 is then further coupled with an ADC unit 514.

In FIG. 5, the DAC 502 receives input data bits. Although not depicted in FIG. 5, as described above, the DAC 502 could receive the input data bits after initial pre-processing by the bit processing unit 104, an S/P unit, an IFFT unit, and a P/S unit, and a GI+W insertion unit. Time domain samples of the output of the GI+W insertion unit can be provided to the DAC 502. Furthermore, all frequency carriers could be loaded at full resolution of the DAC 502 (i.e., with no PSD difference) to maximize SNR per frequency carrier at the input to the DAC 502. The DAC 502 can process the time domain samples and can generate an analog signal. The analog signal can be provided to the transmitter band-splitting unit 106 and as described above, the transmitter band-splitting unit 106 can split the input analog signal into N independent frequency band signals. In one example, the transmitter band splitting unit 106 can split the input analog signal into 2 (N=2) independent frequency band signals to yield a highband signal and a lowband signal as described above. When the communication system 500 is configured in the "data transmit" mode, the N independent frequency band signals at the output (514A, 514N) of the transmitter band-splitting unit 106 are filtered by corresponding N filter units 504A, 504N to remove any out-of-band energy. The gains of the filtered N independent frequency band signals can then be varied by corresponding N transmit gain stages 506A, 506N to meet the desired PSD levels. The gain-adjusted N independent frequency band signals are provided to the transmitter band-combining unit 110. The band-combining unit 110 can be an analog multi-band signal combining unit and can combine the N independent frequency band signals to yield a multi-band RF signal to be transmitted. The transmitter band-combining unit 110 can provide the multi-band RF signal to the line driver 508. The line driver 508 can further amplify the multi-band RF signal and can couple the multi-band RF signal to the communication medium 510.

On receiving a multi-band RF signal via the communication medium 510, the receiver band-splitting unit 122 can split the received multi-band signal into N independent frequency bands. In one example, the receiver band-splitting unit 122 can split the received multi-band signal into 2 (N=2) independent frequency band signals to yield a received highband signal and a received lowband signal as described above. When the communication system 500 is configured in a "data receive" mode, the receiver band-splitting unit 122 can provide the N independent frequency band signals at the output (526A, 526N) of the receiver band-splitting unit 122 to the corresponding N filter units 504A, 504N to remove any out-of-band energy. The gain of the filtered N independent frequency band signals (at terminals 520A, 520N) can then be varied by corresponding N receiver gain stages 512A, 512N to maximize the data rate (e.g., PHY rate). The gain-adjusted N independent frequency band signals are provided to the receiver band-combining unit 126. The receiver band-combining unit 126 can combine the N independent frequency band signals to yield a processed multi-band signal for subsequent post-processing. The processed multi-band signal can be provided to the ADC 514. Although not depicted in FIG. 5, the digital serial data stream at the output of the ADC 514 can be processed by a GI+W extraction unit, a S/P unit, an FFT unit, a P/S unit, etc. Finally, the bit extraction unit 128 can decode and extract the data bits received in the multi-band RF signal.

It is noted that in the communication system 500 of FIG. 5, the transmitter gain stages 506A, 506N are different from the receiver gain stages 512A, 512N. For example, the transmitter gain stages 506A, 506N and the receiver gain stages 512A, 512N can have different amplification factors, different gain ranges, different amplification requirements (e.g., low noise amplifiers (LNAs) may be used as part of the receiver gain stages 512A, 512N but may not be required in the transmitter gain stages 506A, 506N), etc. However, in some implementations, as described with reference to FIG. 6, the same gain stages can be used during transmit and receive operations.

FIG. 6 is an example block diagram of a third embodiment of a mechanism for optimizing the data rate of a multi-band multi-rate communication. FIG. 6 depicts a multi-band multi-carrier communication system 600 in a single DAC/single ADC, shared filter and shared gain stage configuration. The communication unit 600 comprises the DAC 502 coupled to a band-splitting unit 602. When the communication system 600 operates in the "data transmit" mode, the DAC 502 is coupled to the band-splitting unit 602. This is achieved by coupling an output terminal 608 of the DAC 502 to an input terminal 610 of the band-splitting unit 602. In the "data transmit" mode, the band-splitting unit 602 splits the input data bits into N independent frequency bands. The band-splitting unit 602 is coupled to N filters 604A, 604N. Also, each of the N filters 604A, 604N are respectively coupled to gain stages 606A, 606N. In FIG. 6, the output of the filter 604A is provided as an input to the gain stage 606A. Likewise, the output of the filter 604N is provided as an input to the gain stage 606N. The output of the gain stages 606A, 606N are provided to a band-combining unit 608. The band-combining unit 608 may or may not be coupled to the line driver 508 depending on whether the communication system 600 is in the "data transmit" or the "data receive" mode. In the "data transmit" mode, the band-combining unit 608 is coupled to the line driver 508. To achieve this, an output terminal 614 of the band-combining unit 608 is coupled to an input terminal 618 of the line driver 508. The line driver 508 is then coupled to the communication medium 510. When the communication system 600 operates in the "data receive" mode, a multi-band RF signal received at the communication system 600 via the communication medium 510 is provided to the band-splitting unit 602. For this, the received multi-band signal at terminal 612 (after being received via the communication medium 510) is coupled to the input terminal 610 of the band-splitting unit 602. The band-splitting unit 602 can split the received multi-band signal into N independent frequency bands. Each of the filters 604A, 604N can filter a corresponding one of the N independent frequency bands. Each of the gain stages 606A, 606N can filter a corresponding one of the filtered N independent frequency bands. The band-combining unit 608 can combine the N independent frequency band signals to yield a processed received multi-band signal. In the "data receive" mode, the output terminal 614 of the band-combining unit 608 is directly provided to the ADC 514 (thus bypassing the line driver 508). Although not depicted in FIG. 6, as described above, the DAC 502 could receive the input data bits after initial pre-processing by the bit processing unit 104, an S/P unit, an IFFT unit, and a P/S unit, a GI+W insertion unit, etc. Also, the digital serial data stream at the output of the ADC 514 can be processed by a GI+W extraction unit, a S/P unit, an FFT unit, a P/S unit, etc. Finally, the bit extraction unit 128 can decode and extract the data bits received in the multi-band RF signal.

It is noted that in processing multiple independent frequency bands (as described with reference to FIGS. 5-6), the frequency bands can be evaluated from the frequency band with the highest signal level (e.g., the lowest frequency band) to the frequency band with the lowest signal level (e.g., the highest frequency band). Typically, the higher frequency bands can support higher data rates (and can tolerate a greater level of noise leakage from the other frequency bands associated with higher signal level) as compared to lower frequency bands. In evaluating the frequency bands associated with the highest frequency band to the lowest frequency bands, relative gain adjustments of each frequency band can be reduced limiting the noise leakage from adjacent frequency bands. As will be described with reference to FIG. 7, a low frequency band (i.e., high power) signal can be paired with a high frequency band (i.e., low power) signal to minimize distortion and noise effects.

Figure 7:
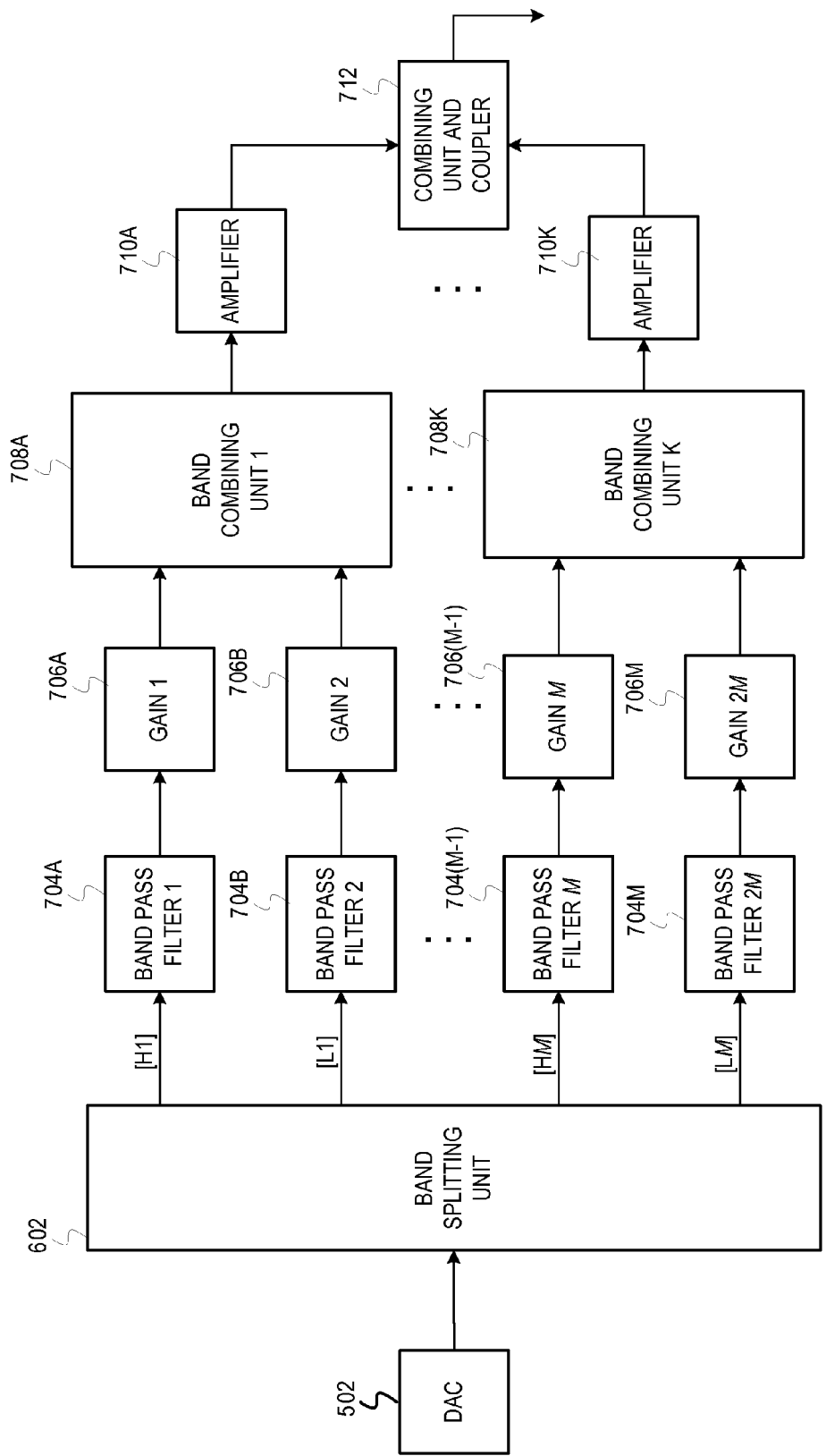
FIG. 7 is an example block diagram illustrating mechanism for transmit optimization by combining highband signals and lowband signals prior to amplification.

FIG. 7 is an example block diagram illustrating mechanism for transmit optimization by combining highband signals and lowband signals prior to amplification. FIG. 7 depicts the DAC 502 coupled to the band-splitting unit 602. The band-splitting unit 602 splits the input signal into M independent frequency bands—with M/2 lowband signals and M/2 highband signals. Each of the M independent frequency bands are provided to a corresponding band pass filter unit. Highband signal HI is provided to band pass filter 704A, lowband signal L1 is provided to band pass filter 704B, highband signal HM is provided to band pass filter 704(M−1), and lowband signal LM is provided to band pass filter 704M. After filtering, the output of the band pass filters 704A, 704B, 704(M−1), and 704M are respectively provided to gain stages 706A, 706B, 706(M−1), and 706M. The output of the gain stages 706A, 706B, 706(M−1), and 706M are provided to K band-combining units where K=M/2. In other words, each band-combining unit receives, as input, one of the highband signals and one of the lowband signals. In FIG. 7, band-combining unit 708A receives, as an input, the output of the gain stages 706A and 706B. The band combining unit 708K receives, as an input, the output of the gain stages 706(M−1) and 706M. The output of the band combining units 708A and 708K are provided to amplifier stages 710A and 710K, respectively. Finally, the outputs of the amplifier stages 710A and 710K are provided to a combining unit and a coupler 712.

In one example, the band-combining units 708A and 708K can be resistive combiners that can be constructed to provide proper matching between the output of the gain stages (fed as input to the band-combining unit) and the communication medium. In another example, the band combining units 708A and 708K can be hybrid combiners, or other suitable types of combiners. Employing the system of FIG. 7 to process the each of the frequency band can enable the frequency band signals to be optimally combined to minimize the crest factor of each of the frequency band signals that are provided to the amplifier stages 710A and 710K. Because the DAC 502 is fully illuminated for all frequency bands, the frequency band signals at the output of the band-splitting unit 602 are at their respective maximum signal level (e.g., maximum amplitude, maximum power level, etc.). After the band-splitting unit 602, the signal level of each of the frequency band signals is adjusted (e.g., amplified or attenuated) to meet PSD requirements. Combining a frequency band with a high signal level (i.e., a lowband signal) with a frequency band with a low signal level (i.e., a highband signal) prior to further amplification can result in a signal with a crest factor that is equivalent to the crest factor of only the frequency band with the high signal level. Combining some of the frequency bands (e.g., at the band-combining units 708A, 708K) prior to subsequent amplification (e.g., at the amplifier stages 710A, 710K) and comprehensive combining (at the combining unit and coupler 712) can improve signal fidelity. Although the implementation of FIG. 7, results in an increase in number of signal combiners, the number of gain stages required is significantly reduced.

It should be understood that the depicted diagrams (FIGS. 1-7) are examples meant to aid in understanding embodiments and should not be used to limit embodiments or limit scope of the claims. Embodiments may perform additional operations, fewer operations, operations in a different order, operations in parallel, and some operations differently. For instance, in addition to the communication system implementations depicted in FIGS. 4-6, other embodiments of the communication system that enable the full resolution of the DAC and the ADC to maximize the SNR of the waveforms on each independent frequency band can also be implemented. For example, with reference to FIGS. 5 and 6, the N independent received frequency band signals could be combined after independent ADC processing. The processed multi-band signal can be provided to a single FFT unit and for subsequent post-processing. In another implementation, a single band OFDM architecture (e.g., comprising one transmit chain and one receive chain) may also be used to independently process each frequency band of the multi-band signal. The processing components of the single transmit chain may be used to filter and gain adjust each frequency band signal separately and to temporarily buffer the processed frequency band signal until all the frequency band signals that comprise the multi-band signal are processed. The band-combining unit 126 can then combine all the buffered processed frequency band signals to yield the multi-band signal for transmission (or, in the case of the receiving device 120, to extract the data bits).

In some implementations, the SNR of each frequency band may be affected by the noise levels of one or more of the other independent frequency bands. Independently filtering and gain adjusting each of the N independent frequency band signals prior to processing (at the receiving device 120) can reduce out-of-band noise especially for frequency bands that are not adjacent to the desired frequency band. The energy of the out-of-band signals, in some implementations, may be taken into consideration when calculating the SNR of the desired frequency band. The amplification gain at the receiver amplifiers can be adjusted so that noise levels associated with each of the independent frequency bands is balanced, the desired SNR is achieved, and the data rate of the overall communication system is maximized. For example, the gain of the frequency band signal with the lowest PSD (e.g., the highband signal) can be increased until the best PHY rate for the overall communication system is maximized.

Although the operations of FIGS. 2-3 as described as being performed as part of an initial channel estimation process when a communication link is first established between the transmitting device 102 and the receiving device 120, embodiments are not so limited. The operations described herein for data rate optimization can also be implemented as part of a power control algorithm for supporting multi-dwelling unit (MDU) communication. In one implementation, the power control algorithm for MDU communication could be activated based on the performance of the lowband signal. After the lowband performance measurement (e.g., the lowband SNR) is determined, the data rate can be optimized to achieve peak data rate performance in the MDU communication environment. The operations described herein can also be executed periodically to optimize the gain settings in response to a medium access control (MAC) mechanism or other control mechanism. The transmitting device 102 and the receiving device 120 could periodically sample the communication channel and adjust the gain settings based on the lowband performance measurements.

Lastly, although not described with reference to FIGS. 1-7, implementation of band filtering and gain adjustment in analog domain (as described herein) can result in signal distortion and loss of fidelity of signal. To generate the independent frequency band signals, the filters (e.g., typically band-pass filters) may be required to provide very high rejection near passband edges of the filters to minimize the amount of energy that bleeds through the passband. The finite transition band of the filters can result in spectral distortion near the transition bands and, consequently, in violation of the required PSD of one or more of the frequency bands. In one implementation, each frequency band signal can be pre-distorted (e.g., during transmit and receive operations) so that when the pre-distorted frequency band signals are finally combined, the resultant spectrum of the combined multi-band signal exhibits the desired PSD mask. During the channel adaptation mode, the receiving device 120 can receive a test signal from the transmitting device 102, can process the independent frequency band signals, and can iteratively adjust the amplitude and phase of the frequency carriers (e.g., in the frequency bands that may be subject to distortion) so that desired transmit PSD is achieved in the transition band of each of the receiver filters. Pre-distortion can also be used to compensate for analog circuit imperfections such as filter delay mismatch, limited selectivity, amplitude and phase imbalance from combiners, etc. The pre-distortion values can be stored at the transmitting device 102 and at the receiving device 120 for use during normal operation.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
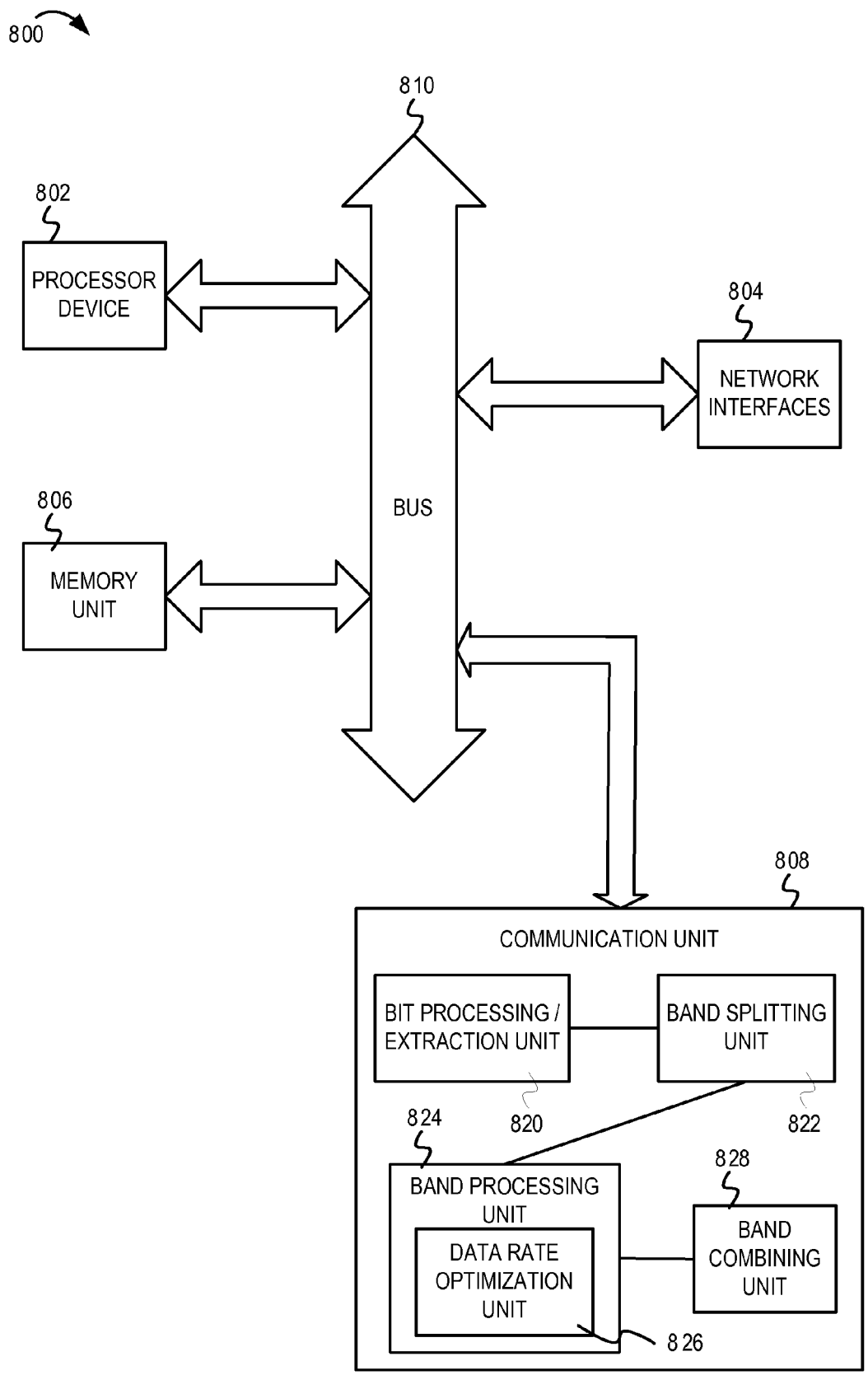
FIG. 8 is a block diagram of one embodiment of an electronic device including a mechanism for optimizing data rate of multi-band multi-carrier communication systems.

FIG. 8 is a block diagram of one embodiment of an electronic device 800 including a mechanism for optimizing data rate of multi-band multi-carrier communication systems. In some implementation, the electronic device 800 may be a personal computer (PC), a laptop, a netbook, a mobile phone, a personal digital assistant (PDA), a smart appliance, or other electronic systems configured to communicate across a wired network (e.g., a powerline network or an Ethernet network) or a wireless communication network (e.g., WLAN). The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport, InfiniBand®, NuBus, etc.), and network interfaces 804 that include one or more of a wireless network interface (e.g., a WLAN interface, a Bluetooth® interface, a WiMAX interface, a ZigBee° interface, a Wireless USB interface, etc.) and a wired network interface (e.g., an Ethernet interface, powerline network interface, etc).

The electronic device 800 also includes a communication unit 808. In one implementation, the communication unit 808 comprises a bit processing/extraction unit 820, a band-splitting unit 822, a band-processing unit 824, and a band-combining unit 828. The band-processing unit 824 also comprises a data rate optimization unit 826. During a channel adaption mode, as described with reference to FIGS. 2-3, the data rate optimization unit 826 in conjunction with the communication unit 808 can determine a tone map, gain, and other communication parameters for achieving optimal performance (e.g., SNR) of a communication system comprising the electronic device 800. As described with reference to FIGS. 1-7, the communication unit 808 can apply the communication parameters, during a normal operation mode, to process a multi-band signal to achieve the best performance of the communication system. Any one of the above-described functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., additional network interfaces, peripheral devices, etc.). The processor unit 802 and the network interfaces 804 are coupled to the bus 810. Although illustrated as being coupled to the bus 810, the memory 806 may be coupled to the processor unit 802.

While the embodiments are described with reference to various implementations and exploitations, it will be understood that these embodiments are illustrative and that the scope of the inventive subject matter is not limited to them. In general, techniques for optimizing the data rate of multi-band multi-carrier communication systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. method comprising:
   receiving, at a first network device of a communication system, a first multi-band signal from a second network device of the communication system during a channel adaptation mode;
   splitting, at the first network device, the first multi-band signal into a plurality of independent frequency band signals;
   determining, at the first network device, a first performance measurement of a first frequency band signal of the plurality of independent frequency band signals, wherein the first frequency band signal corresponds to a lowest frequency band signal;
   determining, at the first network device, whether the first performance measurement surpasses a performance measurement threshold;
   in response to determining that the first performance measurement surpasses the performance measurement threshold,
      determining, at the first network device, first communication parameters for the plurality of independent frequency band signals based, at least in part, on the first performance measurement; and
      providing the first communication parameters from the first network device to the second network device; and
   in response to determining that the first performance measurement does not surpass the performance measurement threshold,
      determining not to ascertain the first communication parameters at the first network device.

2. The method of claim 1, wherein the first performance measurement is one of a mean signal-to-noise ratio, a bit error rate, a median signal-to-noise ratio, a mean bit load, and a median bit load.

3. The method of claim 1, wherein the first communication parameters for the plurality of independent frequency band signals comprise one of a processing gain for each of the plurality of independent frequency band signals, a data rate for each of the plurality of independent frequency band signals, and a bit load for each of the plurality of independent frequency band signals.

4. The method of claim 1, wherein, if the first performance measurement comprises a signal-to-noise ratio associated with the first frequency band signal, said determining the first performance measurement further comprises:
    determining, at the first network device, whether the signal-to-noise ratio associated with the first frequency band signal surpasses a threshold signal-to-noise ratio;
    determining, at the first network device, the first communication parameters based, at least in part, on the signal-to-noise ratio associated with the first frequency band signal in response to determining that the signal-to-noise ratio associated with the first frequency band signal surpasses the threshold signal-to-noise ratio; and
    determining, at the first network device, to not ascertain the first communication parameters in response to determining that the signal-to-noise ratio associated with the first frequency band signal does not surpass the threshold signal-to-noise ratio.

5. The method of claim 4, wherein, if the first communication parameters comprise a tone map associated with the plurality of independent frequency band signals, said determining the first communication parameters comprises:
    processing the plurality of independent frequency band signals to determine the tone map associated with the plurality of independent frequency band signals; and
    providing the tone map associated with the plurality of independent frequency band signals from the first network device to the second network device.

6. The method of claim 1, further comprising:
    storing, at the first network device, the first communication parameters for processing subsequent multi-band signals received at the first network device from the second network device in a normal operating mode.

7. The method of claim 1, wherein in response to receiving a second multi-band signal from the second network device during the channel adaptation mode, the method further comprises:
    splitting the second multi-band signal into the plurality of independent frequency band signals;
    determining a second performance measurement of the first frequency band signal associated with the second multi-band signal;
    determining second communication parameters for the plurality of independent frequency band signals based, at least in part, on the second performance measurement;
    determining whether the second communication parameters result in improved system performance as compared to the first communication parameters;
    in response to determining that the second communication parameters result in improved system performance as compared to the first communication parameters, determining to apply the second communication parameters for subsequent communication between the first network device and the second network device; and
    in response to determining that the second communication parameters do not result in improved system performance as compared to the first communication parameters, determining to apply the first communication parameters for subsequent communication between the first network device and the second network device.

8. The method of claim 1, wherein in response to receiving a second multi-band signal from the second network device in a normal operating mode, the method further comprises:
    splitting, at the first network device, the second multi-band signal into the plurality of independent frequency band signals;
    adjusting a signal level associated with each of the plurality of independent frequency band signals in accordance with the first communication parameters;
    combining the adjusted plurality of independent frequency band signals; and
    extracting, at the first network device, data bits from the combined adjusted plurality of independent frequency band signals.

9. The method of claim 1 comprising:
    determining, at the first network device, to transmit input data bits to the second network device;
    determining, at the first network device, second communication parameters for communication between the first network device and the second network device; and
    processing, at the first network device, the input data bits in accordance with the second communication parameters to generate a second multi-band signal for transmission to the second network device.

10. The method of claim 9, wherein said processing the input data bits in accordance with the second communication parameters further comprises:
    allocating the input data bits across a plurality of independent frequency bands in accordance with the second communication parameters;
    combining signals generated based, at least in part, on said allocating the input data bits across the plurality of independent frequency bands in accordance with the second communication parameters to yield the second multi-band signal; and
    providing the second multi-band signal to the second network device.

11. A first network device comprising:
    a transceiver unit operable to:
        receive a first multi-band signal from a second network device of a communication system during a channel adaptation mode, wherein the communication system comprises the first network device;
    a band splitting unit operable to:
        split the first multi-band signal into a plurality of independent frequency band signals; and
    a band processing unit operable to:
        determine a first performance measurement of a first frequency band signal of the plurality of independent frequency band signals, wherein the first frequency band signal corresponds to a lowest frequency band signal;
        determine whether the first performance measurement surpasses a performance measurement threshold; and
        determine first communication parameters for the plurality of independent frequency band signals based, at least in part, on the first performance measurement, in response to determining that the first performance measurement surpasses the performance measurement threshold; and
        determine not to ascertain the first communication parameters, in response to determining that the first performance measurement does not surpass the performance measurement threshold; and
    the transceiver unit further operable to:
        provide the first communication parameters to the second network device, in response to determining that the first performance measurement surpasses the performance measurement threshold.

12. The first network device of claim 11, wherein the first performance measurement is one of a mean signal-to-noise ratio, a bit error rate, a median signal-to-noise ratio, a mean bit load, and a median bit load.

13. The first network device of claim 11, wherein the first communication parameters for the plurality of independent frequency band signals comprise one of a processing gain for each of the plurality of independent frequency band signals, a data rate for each of the plurality of independent frequency band signals, and a bit load for each of the plurality of independent frequency band signals.

14. The first network device of claim 11, wherein the band processing unit is further operable to:
 store the first communication parameters for processing subsequent multi-band signals received at the first network device from the second network device in a normal operating mode.

15. The first network device of claim 11, wherein in response to the transceiver unit receiving a second multi-band signal from the second network device during the channel adaptation mode,
 the band splitting unit is operable to:
  split the second multi-band signal into the plurality of independent frequency band signals;
 the band processing unit is operable to:
  determine a second performance measurement of the first frequency band signal associated with the second multi-band signal;
  determine second communication parameters for the plurality of independent frequency band signals based, at least in part, on the second performance measurement;
  determine whether the second communication parameters result in improved system performance as compared to the first communication parameters;
  determine to apply the second communication parameters for subsequent communication between the first network device and the second network device, in response to the band processing unit determining that the second communication parameters result in improved system performance as compared to the first communication parameters; and
  determine to apply the first communication parameters for subsequent communication between the first network device and the second network device, in response to the band processing unit determining that the second communication parameters do not result in improved system performance as compared to the first communication parameters.

16. The first network device of claim 11, wherein in response to the transceiver unit receiving a second multi-band signal from the second network device in a normal operating mode,
 the band splitting unit is operable to:
  split the second multi-band signal into the plurality of independent frequency band signals;
 the band processing unit is operable to:
  adjust a signal level associated with each of the plurality of independent frequency band signals in accordance with the first communication parameters;
 a band combining unit is operable to:
  combine the adjusted plurality of independent frequency band signals; and
 a bit extraction unit is operable to:
  extract data bits from the combined adjusted plurality of independent frequency band signals.

17. The first network device of claim 11, wherein the band processing unit is operable to:
 determine to transmit input data bits to the second network device;
 determine second communication parameters for communication between the first network device and the second network device; and
 process the input data bits in accordance with the second communication parameters to generate a second multi-band signal for transmission to the second network device.

18. The first network device of claim 17, wherein the band processing unit operable to process the input data bits in accordance with the second communication parameters further comprises:
 a bit splitting unit operable to:
  allocate the input data bits across a plurality of independent frequency bands in accordance with the second communication parameters;
 a band combining unit operable to:
  combine signals generated based, at least in part, on the bit splitting unit allocating the input data bits across the plurality of independent frequency bands in accordance with the second communication parameters to yield the second multi-band signal; and
 the transceiver unit operable to:
  provide the second multi-band signal to the second network device.

19. A non-transitory machine-readable storage medium, having instructions stored therein, which, when executed by a processor causes the processor to perform operations that comprise:
 receiving a first multi-band signal at a first network device of a communication system from a second network device of the communication system during a channel adaptation mode;
 splitting the first multi-band signal into a plurality of independent frequency band signals;
 determining a first performance measurement of a first frequency band signal of the plurality of independent frequency band signals, wherein the first frequency band signal corresponds to a lowest frequency band signal;
 determining whether the first performance measurement surpasses a performance measurement threshold;
 in response to determining that the first performance measurement surpasses the performance measurement threshold,
  determining first communication parameters for the plurality of independent frequency band signals based, at least in part, on the first performance measurement; and
  providing the first communication parameters to the second network device; and
 in response to determining that the first performance measurement does not surpass the performance measurement threshold,
  determining not to ascertain the first communication parameters at the first network device.

20. The machine-readable storage medium of claim 19, wherein in response to receiving a second multi-band signal from the second network device during the channel adaptation mode, the operations further comprise:
 splitting the second multi-band signal into the plurality of independent frequency band signals;
 determining a second performance measurement the plurality of frequency band signal associated with the second multi-band signal;
 determining second communication parameters for the plurality of independent frequency band signals based, at least in part, on the second performance measurement;
 determining whether the second communication parameters result in improved system performance as compared to the first communication parameters;
 in response to determining that the second communication parameters result in improved system performance as compared to the first communication parameters, determining to apply the second communication parameters for subsequent communication between the first network device and the second network device; and in response to determining that the second communication parameters do not result in improved system performance as compared to the first communication parameters, determining to apply the first communication parameters for subsequent communication between the first network device and the second network device.

21. The machine-readable storage medium of claim 19, wherein in response to receiving a second multi-band signal from the second network device in a normal operating mode, the operations further comprise:

splitting the second multi-band signal into the plurality of independent frequency band signals;

adjusting a signal level associated with each of the plurality of independent frequency band signals in accordance with the first communication parameters;

combining the adjusted plurality of independent frequency band signals; and extracting, at the first network device, data bits from the combined adjusted plurality of independent frequency band signals.

\* \* \* \* \*